(12) United States Patent
Jahge

(10) Patent No.: US 7,969,723 B2
(45) Date of Patent: Jun. 28, 2011

(54) ELECTROACTIVE ACTUATOR FOR PORTABLE COMMUNICATION DEVICES

(75) Inventor: Anders Jahge, Taby (SE)

(73) Assignee: Sony Ericsson Mobile Communications AB, Lund (SE)

( * ) Notice: Subject to any disclaimer, the term of this patent is extended or adjusted under 35 U.S.C. 154(b) by 103 days.

(21) Appl. No.: 12/399,076

(22) Filed: Mar. 6, 2009

(65) Prior Publication Data

US 2010/0226075 A1     Sep. 9, 2010

(51) Int. Cl.
*G06F 1/16* (2006.01)
(52) U.S. Cl. .......... 361/679.33; 455/575.4; 235/462.47; 360/234.7; 345/161
(58) Field of Classification Search ............. 361/679.05, 361/679.06, 679.08, 679.11, 679.12, 679.13, 361/679.14–679.19, 679.21–679.29; 455/575.4, 455/575.5; 235/462.45, 462.47, 462.48; 360/231, 264.7, 234.7; 345/156, 161, 87
See application file for complete search history.

(56) References Cited

U.S. PATENT DOCUMENTS

| | | | |
|---|---|---|---|
| 2007/0152974 A1 | 7/2007 | Kim et al. | |
| 2007/0279847 A1* | 12/2007 | Li et al. | 361/679 |
| 2008/0143693 A1 | 6/2008 | Schena | |
| 2010/0022286 A1* | 1/2010 | Wang et al. | 455/575.4 |

FOREIGN PATENT DOCUMENTS

WO  WO 2004/079832 A2   9/2004
WO  WO 2009/000336 A1   12/2008

OTHER PUBLICATIONS

International Search Report, corresponding to PCT/EP2009/055930, mailing date of Nov. 11, 2009.
Written Opinion of the International Searching Authority, corresponding to PCT/EP2009/055930, mailing date of Nov. 11, 2009.

* cited by examiner

*Primary Examiner* — Hung V Duong
(74) *Attorney, Agent, or Firm* — Renner, Otto, Boisselle & Sklar, LLP (57) ABSTRACT

The invention relates to a portable communication device which comprises a first part, a second part, and one or more electroactive polymer actuators, where the electroactive polymer actuator is connected to the first part and to the second part. The invention also comprise a control unit, where the electroactive polymer actuator is adapted to move the first part in relation to the second part, and that the control unit is adapted to control the electroactive polymer actuator.

23 Claims, 9 Drawing Sheets

ELECTROACTIVE ACTUATOR FOR PORTABLE COMMUNICATION DEVICES

TECHNICAL FIELD

The present invention relates to the field of portable electronic devices and, in particular, to using electroactive actuators in portable communication devices. The present invention especially targets the area of portable mobile communication devices, such as mobile phones, where the usage of electroactive actuators to perform mechanical operations may be highly sought for.

BACKGROUND

Almost everybody today owns and uses some kind of mobile communication device, such as a mobile phone, a portable digital assistant, a netbook, or a laptop computer, in their everyday life. These devices consist of both electronic and mechanical parts, and although the development of the electronic parts has progressed quite rapidly, the development of the mechanical parts has not. The mechanical solutions used in today's mobile communication device for moving parts, such as hatches, slide out keyboards, movable displays, etc., are still crude and bulky. Thus, the need for more elaborate mechanical solutions for moving parts in today's mobile communication devices are highly sought for.

SUMMARY OF THE INVENTION

With the above description in mind, then, an aspect of the present invention is to provide a more elaborate mechanical solution to moving parts in today's mobile communication devices which seeks to mitigate, alleviate, or eliminate one or more of the above-identified deficiencies in the art and disadvantages singly or in any combination.

As will be described in more detail by the aspects of the present invention below, one way to provide such mechanical solution for moving parts in a mobile communication device is to use electronically controllable electroactive polymer actuators, which are capable of moving parts in all three dimensions without being bulky.

A first aspect of the present invention relates to a portable communication device, comprising a first part, a second part, one or more electroactive polymer actuators, wherein said electroactive polymer actuator is connected to said first part and said second part, and a control unit, wherein said electroactive polymer actuator is adapted to move said first part in relation to said second part, and that said control unit is adapted to control said electroactive polymer actuator.

The control unit in the portable communication device may be adapted to control said electroactive polymer actuator in two dimensions.

The control unit in the portable communication device may be adapted to control said electroactive polymer actuator in at least three dimensions.

The control unit in the portable communication device may be adapted to control the electroactive polymer actuator by controlling the outer shape of said electroactive polymer actuator.

The control unit in the portable communication device may be adapted to control the electroactive polymer actuator by controlling the volume of said electroactive polymer actuator.

The electroactive polymer actuator in the portable communication device may be adapted to move said first and said second part in a stepwise motion in relation to each other.

The electroactive polymer actuator in the portable communication device may be adapted to move said first and said second part in a sliding motion in relation to each other.

At least one of said first part and said second part in the portable communication device may be an electronically maneuverable part or a mechanically maneuverable part or a combination thereof.

The first part may be the casing of said portable communication device, and the second part may be a hatch.

The first part may be the casing of said portable communication device, and the second part may be a display.

The first part may be the casing of said portable communication device, and the second part may be a button.

The first part may be the casing of said portable communication device, and the second part may be a pressure sensitive device.

The first part may be the casing of said portable communication device, and the second part may be a light sensitive device.

The first part may be the casing of said portable communication device, and the second part may be an antenna.

The first part may be the casing of said portable communication device, and the second part may be a speaker element.

The first part may be the casing of said portable communication device, and the second part may be a microphone.

The first part may be the casing of said portable communication device, and the second part may be a contact.

A second aspect of the present invention relates to a method for moving a first part in relation to a second part in a portable communication device, wherein said movement is performed by one or more electroactive polymer actuators, and wherein the electroactive polymer actuators are controlled by a control unit.

The method may further comprise that the control unit controls the electroactive polymer actuator by applying a voltage to the electroactive polymer actuator.

The method may further comprise that the control unit controls the outer shape of said electroactive polymer actuator by altering an applied voltage to the electroactive polymer actuator.

The method may further comprise that the control unit controls the volume of said electroactive polymer actuator by altering an applied voltage to the electroactive polymer actuator. Any of the features in the first, second, and third aspect of the present invention above may be combined in any way possible.

BRIEF DESCRIPTION OF THE DRAWINGS

Further objects, features, and advantages of the present invention will appear from the following detailed description of some embodiments of the invention, wherein some embodiments of the invention will be described in more detail with reference to the accompanying drawings, in which.

DETAILED DESCRIPTION

Embodiments of the present invention relate, in general, to the field of portable communication devices and, in particularly, to using electroactive polymer actuators, from hereinafter also referred to as electroactive actuators, in such devices.

A preferred embodiment relates to a portable communication device, such as a mobile phone, including at least one electroactive actuator for moving parts in such a device. However, it should be appreciated that the invention is as such equally applicable to electronic devices which do not include any radio communication capabilities. Examples of such electronic devices may for instance be global positioning system devices, laptops (such as standard, ultraportable, netbooks, and micro laptops), handheld computers, gaming devices, accessories to mobile phones, keyboards, etc. However, for the sake of clarity and simplicity, most embodiments outlined in this specification are related to mobile phones.

Embodiments of the present invention will be described more fully hereinafter with reference to the accompanying drawings, in which embodiments of the invention are shown. This invention may, however, be embodied in many different forms and should not be construed as limited to the embodiments set forth herein. Rather, these embodiments are provided so that this disclosure will be thorough and complete, and will fully convey the scope of the invention to those skilled in the art. Like reference signs refer to like elements throughout.

Figure 1:
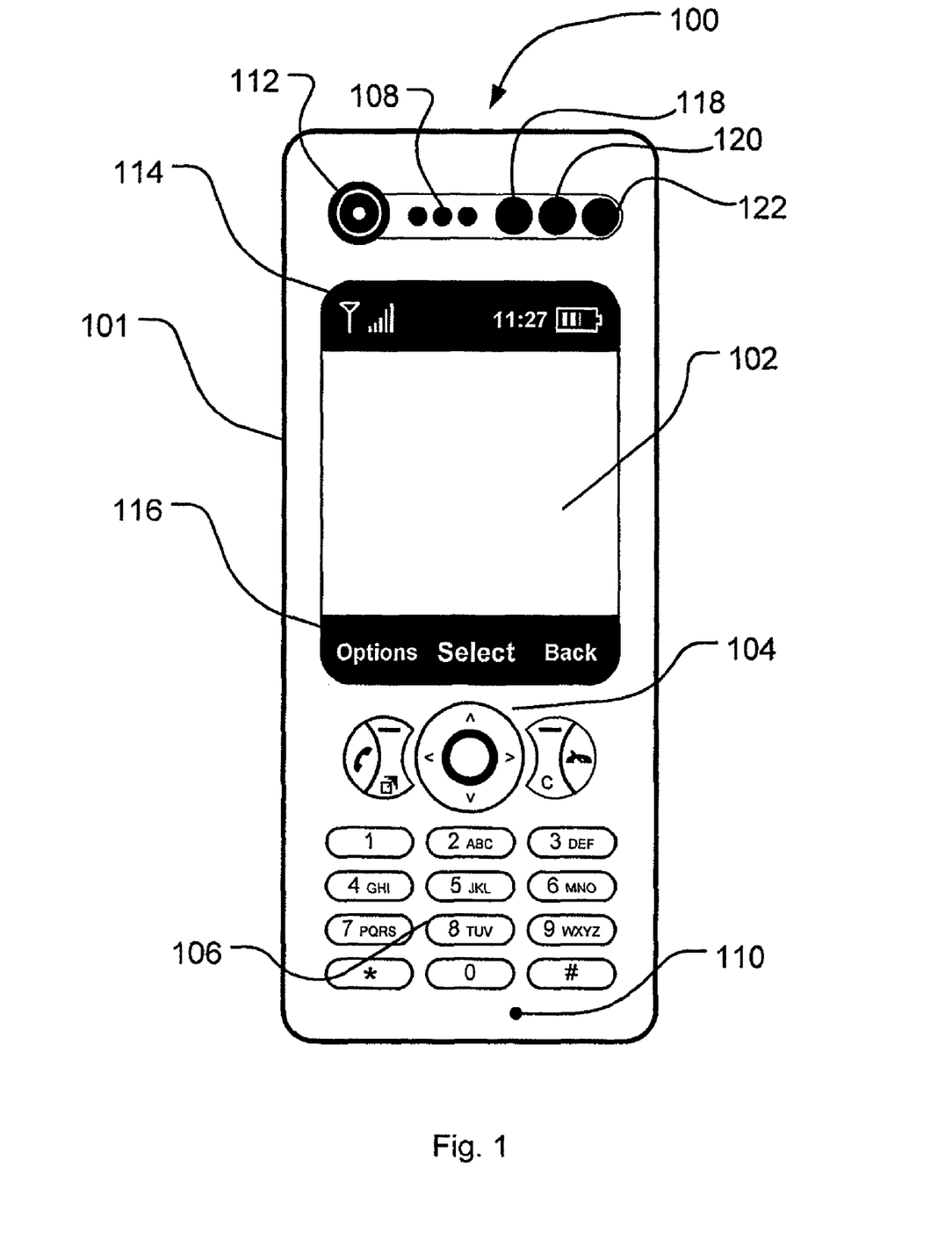
FIG. 1 shows the front side of a portable communication device, in this case a mobile phone.

FIG. 1 shows the front side of an ordinary portable communication device, in this case a mobile phone 100, comprising a casing 101, a display area 102, and means 104 for navigating among items (not shown) displayed in the display area. The casing 101 may be made of any type of casing material such as painted or not painted plastic, metal, glass, polymer material, or a combination thereof. The display area 102 may comprise a status indication area 114 and one or more softkey bars 116. The status indication area 114 may for example include symbols for indicating battery status, reception quality, speaker on/off, present mode, time and date, etc. The status indication section is not in any way limited to include the symbols and the functions presented herein. The softkey bar 116 is operable using the navigation means 104 or, if using a touch sensitive screen, by tapping the softkey directly with a pen-like object, a finger, or other body part. The functions of the softkeys are not limited by the functions indicated in the figure. Neither are the placements of the softkey bar 116 and the status indication area 114 limited to be placed at the bottom and the top of the screen, as shown in the example. The navigation means 104 can be a set of buttons, a rotating input, a joystick, a touch pad, a multidirectional button, but can also be implemented using a touch sensitive display, wherein the displayed items directly can be tapped by a user for selection, or be voice activated via a headset or a built-in microphone. The mobile phone 100 can also comprise other elements normally present in such a device, such as a keypad 106, a speaker 108, a microphone 110, a camera 112, a photo sensor 118 (e.g. ambient light), a infrared light (IR) sensor 120, infrared light emitting diode 122 (IR LED), processing means (not shown), memory means (not shown), one or more accelerometers (not shown), a vibration device (not shown), an AM/FM radio transmitter and receiver (not shown), a digital audio broadcast transmitter and receiver (not shown), a Bluetooth device (not shown), an antenna module (not shown), etc.

Figure 2A:
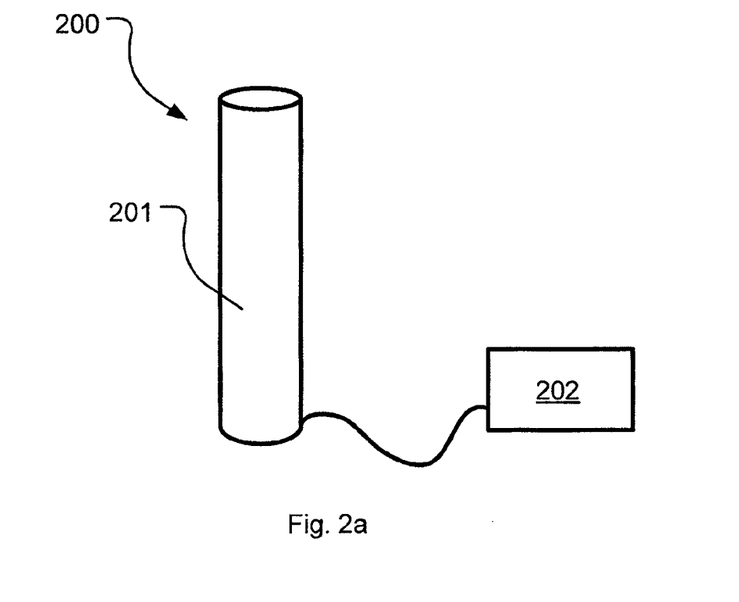
FIG. 2a shows an electroactive polymer actuator.
Figure 2B:
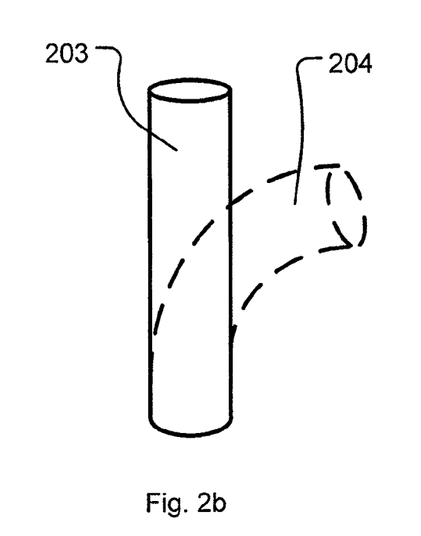
FIG. 2b shows an electroactive polymer actuator that is capable of bending.
Figure 2C:
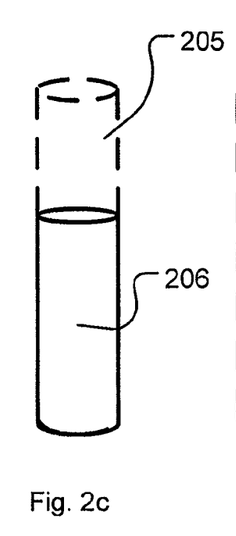
FIG. 2c shows an electroactive polymer actuator that is capable of changing its length.
Figure 2D:
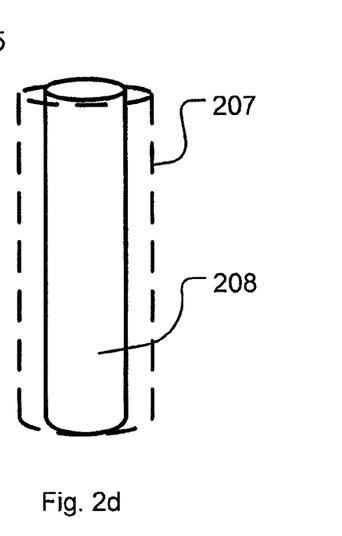
FIG. 2d shows an electroactive polymer actuator that is capable of changing its thickness.

Electroactive Polymers or EAPs belongs to a class of materials that have electrically controllable properties. A brief overview on such electroactive polymers can be found in "Electroactive Polymers (EAP) Actuators as Artificial Muscle—Reality, Potential, and Challenges" 2nd ed. Y. Bar-Cohen (ed.), ISBN 0-8194-5297-1. These electroactive polymers can be used as sensors or actuators capable of being able to undergo a large amount of deformation while sustaining a large force. FIG. 2a shows an electroactive polymer actuator 200 (hereinafter referred to as an electroactive actuator) comprised of at least one electroactive polymer 201 connected to a control unit 202. When a voltage from the control unit 203 is applied to the electroactive actuator 201, the electroactive actuator 201 will change its physical property. How the electroactive actuator 201 changes its physical property depends on its composition and construction, and the applied voltage. In an embodiment the electroactive actuator may bend, from a relaxed position 203 to a bent position 204 (as indicated by jagged lines), as shown in FIG. 2b. The change in physical property, or in this case the bending motion, may either be swift or slow depending on the voltage applied to the electroactive actuator. In another embodiment the electroactive actuator may from a relaxed state 206 grow in size (or shrink in size) to a long state 205 (as indicated by jagged lines), as shown in FIG. 2c. In yet another embodiment the electroactive actuator may from a relaxed state 208 increase its size (or decrease its size) to a thicker state 207 (as indicated by jagged lines), as shown in FIG. 2c. An electroactive actuator may be constructed in such way that it may change its physical property according to one, all, or a combination of, the examples shown in FIGS. 2b, 2c, and 2d. In this way, by applying a voltage to the electroactive actuator in a controlled manner electroactive actuator may be controlled in all three dimensions meaning that it may change its length, either grow or shrink, or move in one or more directions, bend to a specific side, or perform a movements such as a oscillating movement, or a combination thereof.

Figure 3A:
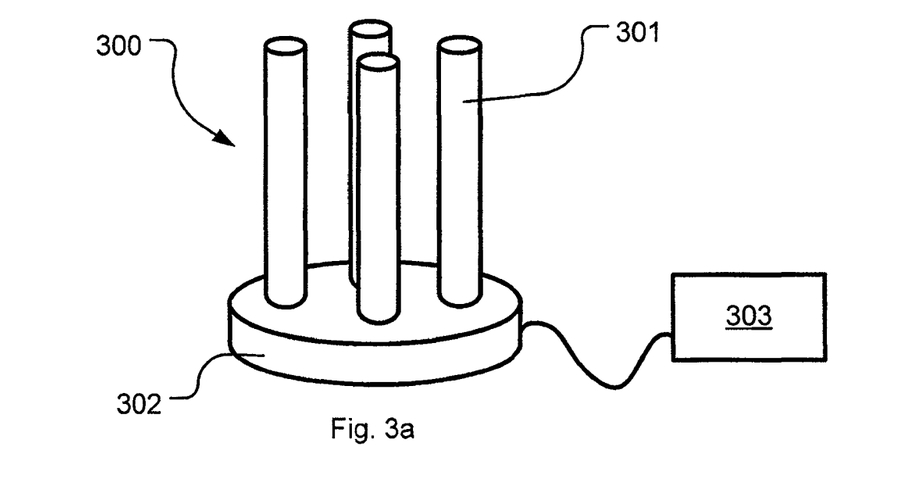
FIG. 3a shows an electroactive muscle comprised of four electroactive polymer actuators and a disc.
Figure 3B:
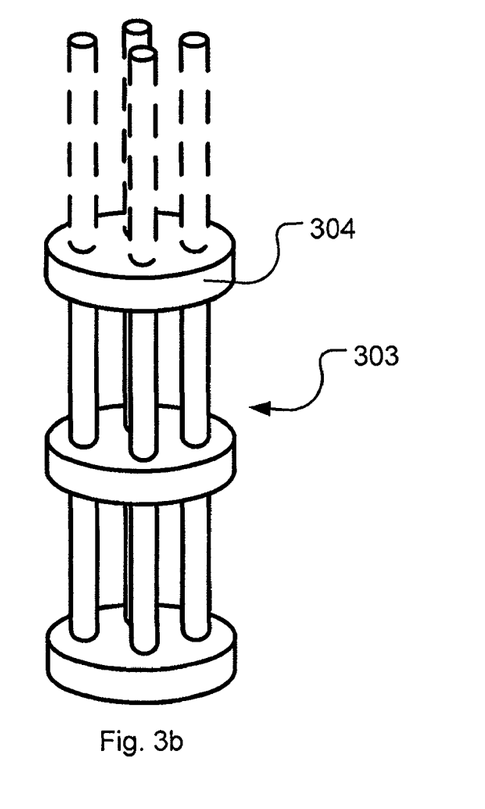
FIG. 3b shows several electroactive muscles combined into a large electroactive muscle.
Figure 3C:
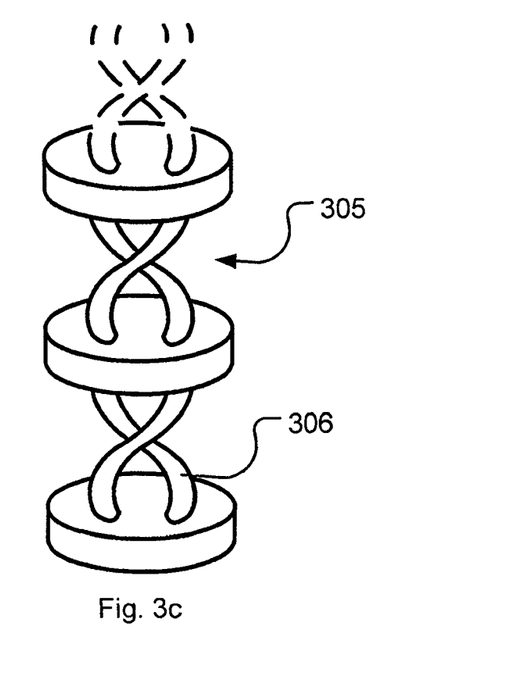
FIG. 3c shows several electroactive muscles, with pre-twisted electroactive polymer actuators, combined into a large electroactive muscle.

FIG. 3a shows an electroactive muscle 300 comprised of four electroactive actuators 301 connected or attached to a disc 302. A control unit 303 is connected to the electroactive actuators 301, and is capable of controlling each individual electroactive actuator 301 independently or in a group/groups. In this way a small but strong and agile electroactive muscle 300 may be constructed, capable of moving a structure connected to the electroactive muscle 300 in all three dimensions. FIG. 3b shows how several electroactive muscles may be combined and stacked on top of each other, separated by discs, to form a larger structure 303 or larger electroactive muscle. Each electroactive muscle segment may either be controlled separately or in group/groups. In this way an electroactive muscle which is capable of performing complex motions in all three dimensions (four dimensions counting x, y, z in space and time) in space is achieved. As shown in FIG. 3c, the electroactive actuators 306 in the electroactive muscle 305 may be pre-twisted or deformed (for instance during fabrication) in a specific way to achieve a specific function. The electroactive actuators 306 in FIG. 3c have been twisted in such way that when operated, by a control unit (not shown in figure), a twisting (drilling) motion may be achieved. The design of an electroactive muscle is not in any way limited to the examples shown in conjunction with FIGS. 3a to 3c. On the contrary, an electroactive muscle may be comprised of a single electroactive actuator or a collection of electroactive actuators in any shape, form, and length. Also, each segment in a larger electroactive muscle may be comprised of segments with various combinations of electroactive actuators, for instance some segments may consist of only a few pre-deformed electroactive actuators while other segments may consist of several non-deformed electroactive actuators, and so on. The discs separating the electroactive actuators may be in any shape or form, and may be comprised of electrically insulating portions and/or electrically conducting portions or a combination thereof. Discs may also act as a stabilizer and/or separator to the electroactive muscle structure. In this way the electroactive actuators runs through the disc via holes so that the disc separates the electroactive actuators apart from each other. In some cases the disc is fixed onto the electroactive actuators and in other cases the disc is movable, in both cases providing stability to the structure.

In the following text and figures an electroactive muscle with four electroactive actuators are used as an example. However, the embodiments described in the text and shown in the figures are not in any way limited to an electroactive muscle of this configuration. In reality, the electroactive muscle may be constructed in several different ways with or without a disc(s), with one or several electroactive actuators, pre-twisted or not pre-twisted electroactive actuators, etc., configured in different ways.

Figure 4:
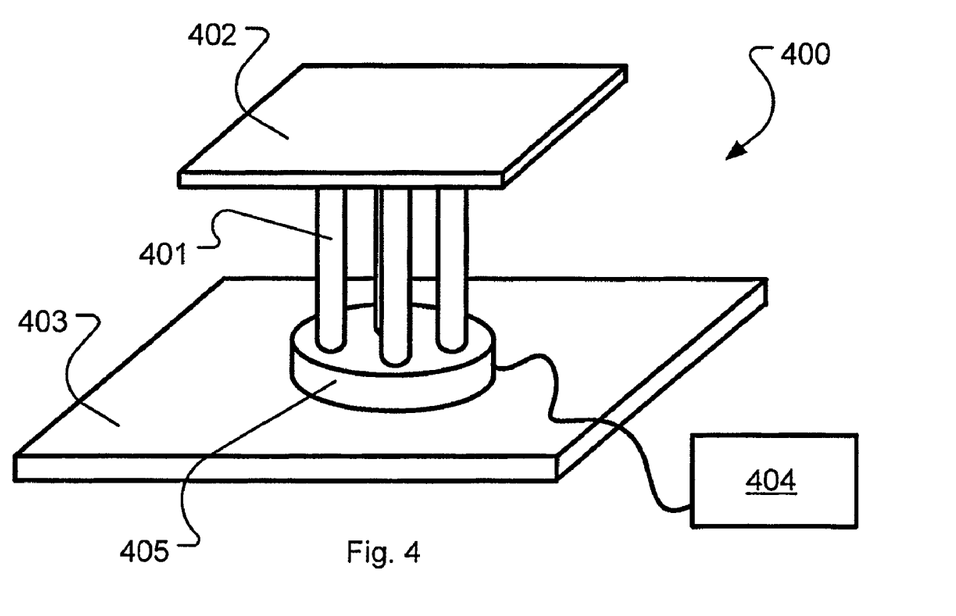
FIG. 4 shows a first and a second part connected together by an electroactive muscle.

FIG. 4 shows a schematic view of an electroactive muscle 400 implemented in or on a device. In this example the electroactive muscle 400, comprised of four electroactive actuators 401 and a disc 405, has been placed on a first part 403 which may be a stationary or a moving part of the device. The electroactive actuators 401, four in this case, have all been connected to a second part 402 which may be stationary or a moving part belonging to the device. A control unit 404 is connected to the electroactive muscle. By applying a signal (voltage or current) from the control unit 404 the electroactive muscle may be operated to move the first part in relation to the second part in all three dimensions (four dimensions counting x, y, z in space and time). The movement of the two parts in relation to each other by the electroactive muscle may either be a fast or slow movement (or anything in between), it may be a stepwise movement or a continuous movement (a sliding or gliding movement), or any combination thereof. The electroactive muscle 400 structure, as presented in FIG. 4, is not in any way limited to the design shown in the figure. There may be electroactive muscle 400 structures with zero or several discs 405, with one or more electroactive actuators 401, and parts 402, 403 of different shape and forms.

Figure 5:
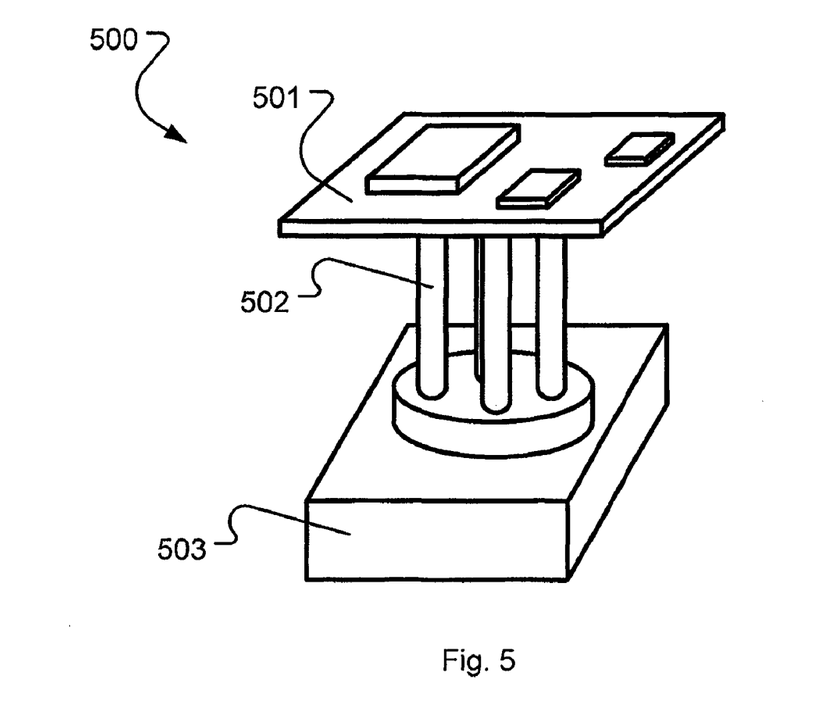
FIG. 5 shows a first and a second part connected together by an electroactive muscle, where the first and the second parts may contain electronically and mechanically parts.

FIG. 5 shows another schematic view of an electroactive muscle 500 implemented in a device. In this example the electroactive muscle 500, comprised of four electroactive actuators 502, has been placed on a first part 503 which in this case may be the casing of the device, or a part containing electronically or mechanically maneuverable parts. The electroactive actuators 502 have been connected to a second part 501 which in this case contain electrically and/or mechanically maneuverable parts. Electronically maneuverable parts may for instance be different kind of sensors, light sensitive devices, signal processing means, light emitting means, memory means, accelerometers, etc., while mechanically maneuverable parts may for instance be levers, springs, buttons, hatches, structural parts of the casing, etc. A control unit (not shown in the figure) is connected to the electroactive muscle, capable of operating the electroactive muscle to move the first part in relation to the second part in all three dimensions (four dimensions counting x, y, z in space and time).

Figure 6:
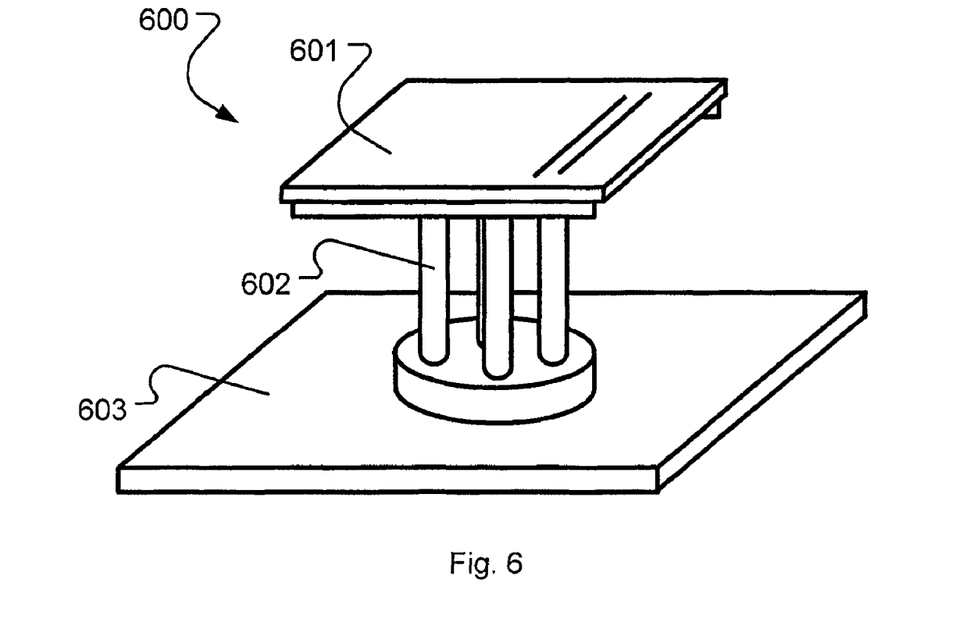
FIG. 6 shows a first and a second part connected together by an electroactive muscle, where the first part is the casing of a device and the second part is a hatch.

FIG. 6 shows another schematic view of an electroactive muscle 600 implemented in a device. In this example the electroactive muscle 600, comprised of four electroactive actuators 602, has been placed on a first part 603 which in this case may be the casing of the device. The electroactive actuators 602 have been connected to a second part 601 which in this case may be, or contain, a hatch made to cover the whole or a part of the devices casing. A control unit (not shown in the figure) is connected to the electroactive muscle, capable of operating the electroactive muscle to move the first part in relation to the second part in all three dimensions (four dimensions counting x, y, z in space and time). In this way, for instance, a battery hatch in a mobile communication device may automatically be slid open and moved away (for example slid to the side) exposing the underplaying battery without the aid of the user. In the same manner a hatch covering the camera lens may automatically slide away from the lens when the user of the mobile communication device wants to take a picture or record a movie. At the same time, the lens covering hatch may be maneuvered by its electroactive muscle in such a way that instead of covering the camera lens it covers the flash, in whole or in part.

Figure 7:
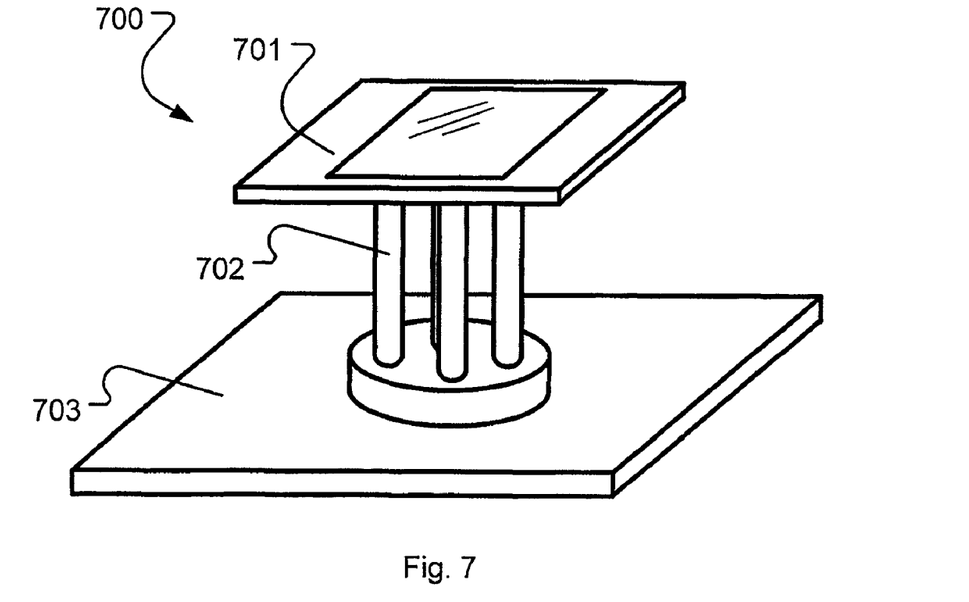
FIG. 7 shows a first and a second part connected together by an electroactive muscle, where the first part is the casing of a device and the second part is a display.

FIG. 7 shows another schematic view of an electroactive muscle 700 implemented in a device. In this example the electroactive muscle 700, comprised of four electroactive actuators 702, has been placed on a first part 703 which in this case may be the casing of the device. The electroactive actuators 702 have been connected to a second part 701 which in this case may be or contain a display unit in the device. A control unit (not shown in the figure) is connected to the electroactive muscle, capable of operating the electroactive muscle to move the first part in relation to the second part in all three dimensions (four dimensions counting x, y, z in space and time). In this way a display in a mobile communication device may automatically be tilted or moved (for instance up/down, sideways, etc.) in relation to the mobile communication devices casing to allow for optimal viewing. This feature may be combined with a light sensor detecting the ambient light of the mobile communication device, and based on the result adjust the displays position in relation to the mobile communication devices casing.

Figure 8:
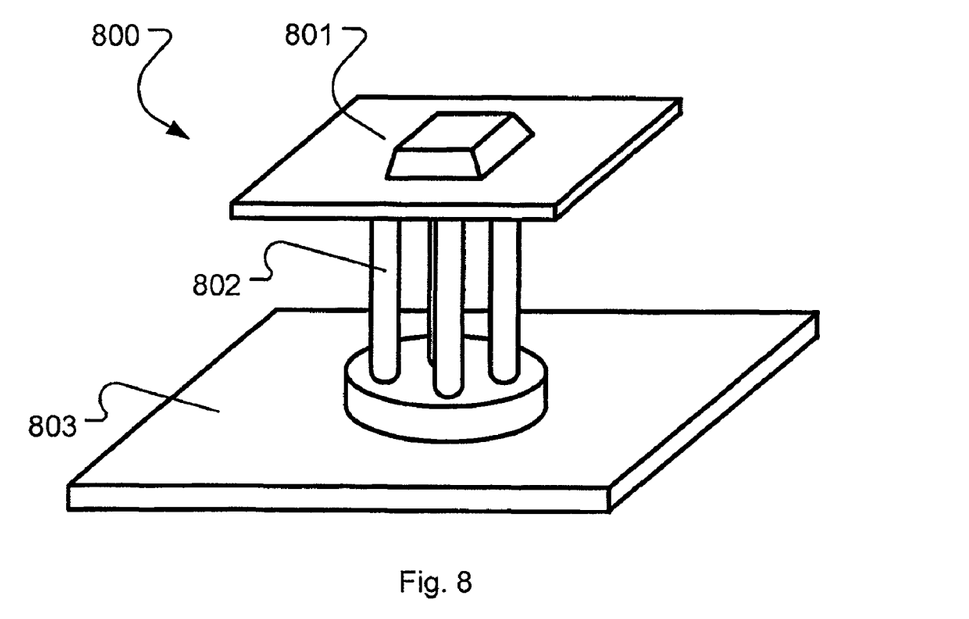
FIG. 8 shows a first and a second part connected together by an electroactive muscle, where the first part is the casing of a device and the second part is a button.

FIG. 8 shows another schematic view of an electroactive muscle 800 implemented in a device. In this example the electroactive muscle 800, comprised of four electroactive actuators 802, has been placed on a first part 803 which in this case may be the casing of the device. The electroactive actuators 802 have been connected to a second part 801 which in this case is or contain a button for operating functions in the device. A control unit (not shown in the figure) is connected to the electroactive muscle, capable of operating the electroactive muscle to move the first part in relation to the second part in all three dimensions (four dimensions counting x, y, z in space and time). In this way buttons or keys in a keyboard may be tilted or moved (for instance up/down, sideways, etc.) in such way which allows for optimal usage for the user. For example there may be applications in the mobile communication device which uses or utilizes only a few keys of a keyboard, and in this case these keys may be raised wile the other keys in the keyboard not used may be lowered in relation to each other, thus indicting to the user which keys that is used and not used in the specific application. In another example the mobile communication device has a flat surface and when keys are need for operating the device they emerge from the flat surface by using the electroactive muscle to rise certain areas which may be used as keys. In yet another example the electroactive muscle provide force feedback to the keys or buttons by actively moving and pushing/releasing against the user's fingers, thus making the mobile communication devices keys and input devices more interactive.

Figure 9:
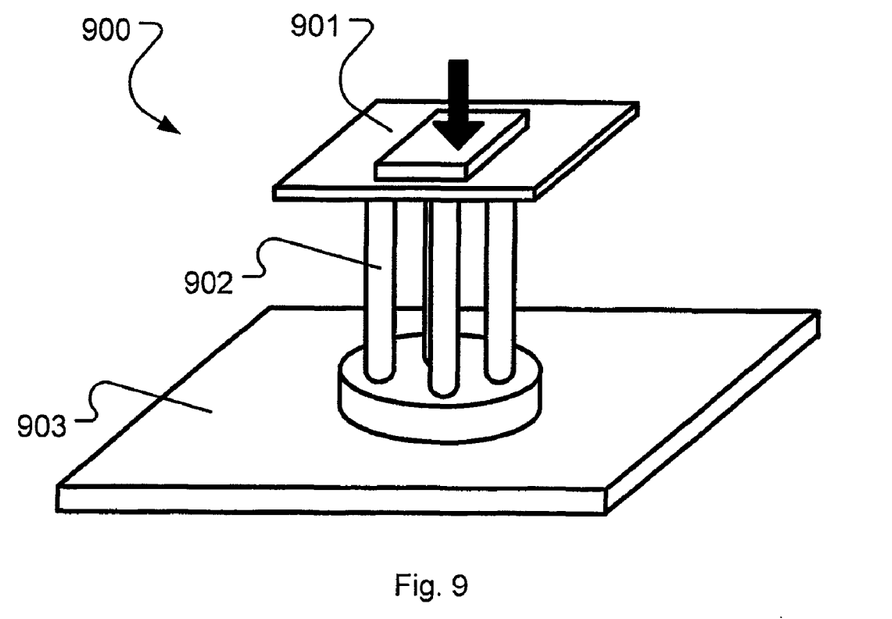
FIG. 9 shows a first and a second part connected together by an electroactive muscle where, the first part is the casing of a device and the second part is a pressure sensitive device.

FIG. 9 shows another schematic view of an electroactive muscle 900 implemented in a device. In this example the electroactive muscle 900, comprised of four electroactive actuators 902, has been placed on a first part 903 which in this case may be the casing of the device. The electroactive actuators 902 have been connected to a second part 901 which in this case may be or contain a pressure sensitive device for operating functions in the device. A control unit (not shown in the figure) is connected to the electroactive muscle, capable of operating the electroactive muscle to move the first part in relation to the second part in all three dimensions (four dimensions counting x, y, z in space and time). In this way pressure sensitive surfaces such as touch screens may be tilted or moved allowing for a more optimal usage. This feature may be combined with the features described in conjunction with FIG. 8.

Figure 10:
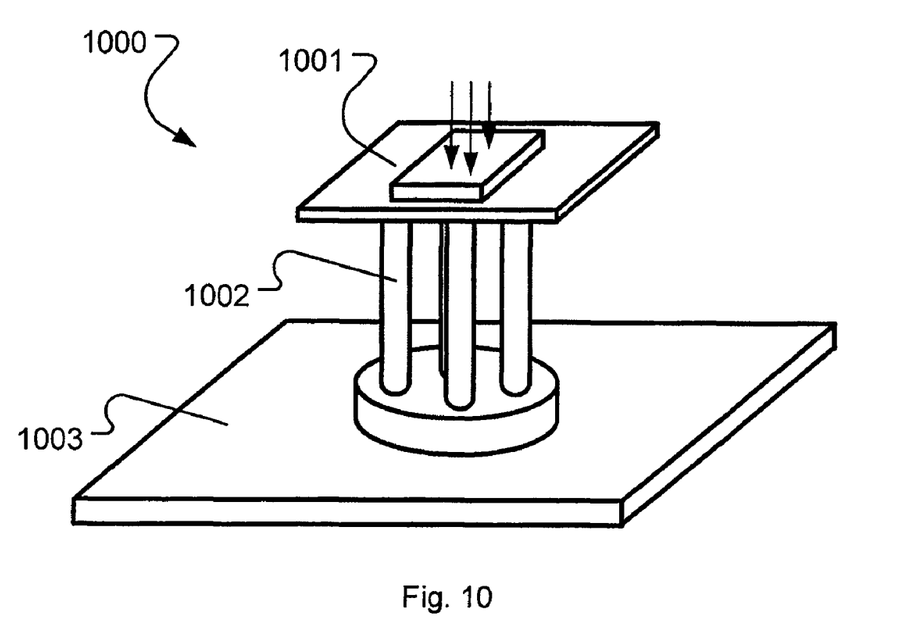
FIG. 10 shows a first and a second part connected together by an electroactive muscle where, the first part is the casing of a device and the second part is a light sensitive device.

FIG. 10 shows another schematic view of an electroactive muscle 1000 implemented in a device. In this example the electroactive muscle 1000, comprised of four electroactive actuators 1002, has been placed on a first part 1003 which in this case may be the casing of the device. The electroactive actuators 1002 have been connected to a second part 1001 which in this case may be or contain a light sensitive device in the device. A control unit (not shown in the figure) is connected to the electroactive muscle, capable of operating the electroactive muscle to move the first part in relation to the second part in all three dimensions (four dimensions counting x, y, z in space and time). In this way the mobile communication device may house a light sensitive device, such as a solar panel, which, with the help of the electroactive muscle 1000, may be moved into an optimal position in relation to the sun, thus allowing for better charging performance. When the solar panel or the light sensitive element isn't used it may be redrawn, electroactive muscle 1000, into the device or onto the devices surface so that the device surface will appear to be flat.

Figure 11:
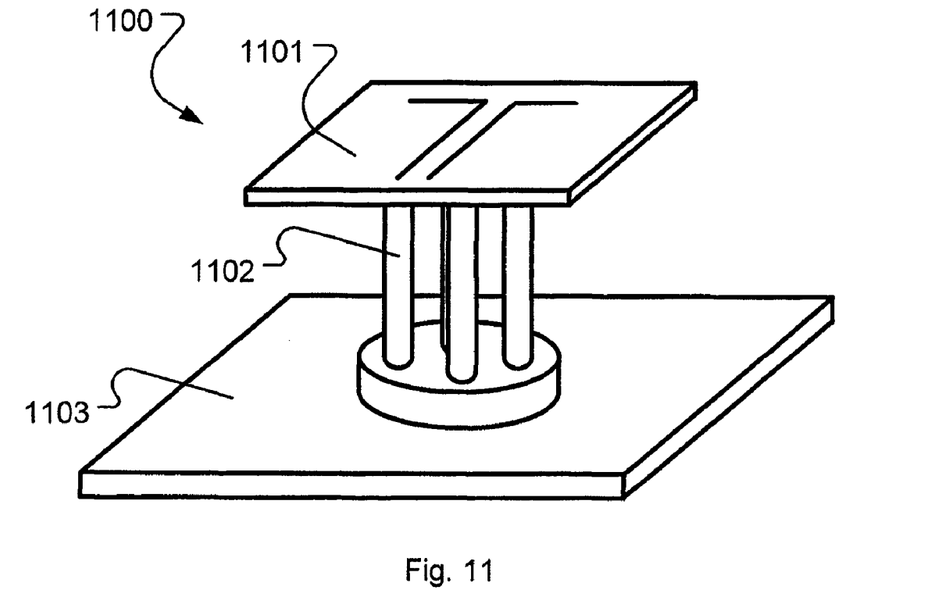
FIG. 11 shows a first and a second part connected together by an electroactive muscle where, the first part is the casing of a device and the second part is an antenna.

FIG. 11 shows another schematic view of an electroactive muscle 1100 implemented in a device. In this example the electroactive muscle 1100, comprised of four electroactive actuators 1102, has been placed on a first part 1103 which in this case may be the casing of the device. The electroactive actuators 1102 have been connected to a second part 1101 which in this case may be or contain an antenna for receiving and transmitting signals to and from the device. A control unit (not shown in the figure) is connected to the electroactive muscle, capable of operating the electroactive muscle to move the first part in relation to the second part in all three dimensions (four dimensions counting x, y, z in space and time). In this way an antenna or an antenna array may be steered, electroactive muscle 1100, in such a way that allows for optimal reception/transmission of signals from and to the device.

Figure 12:
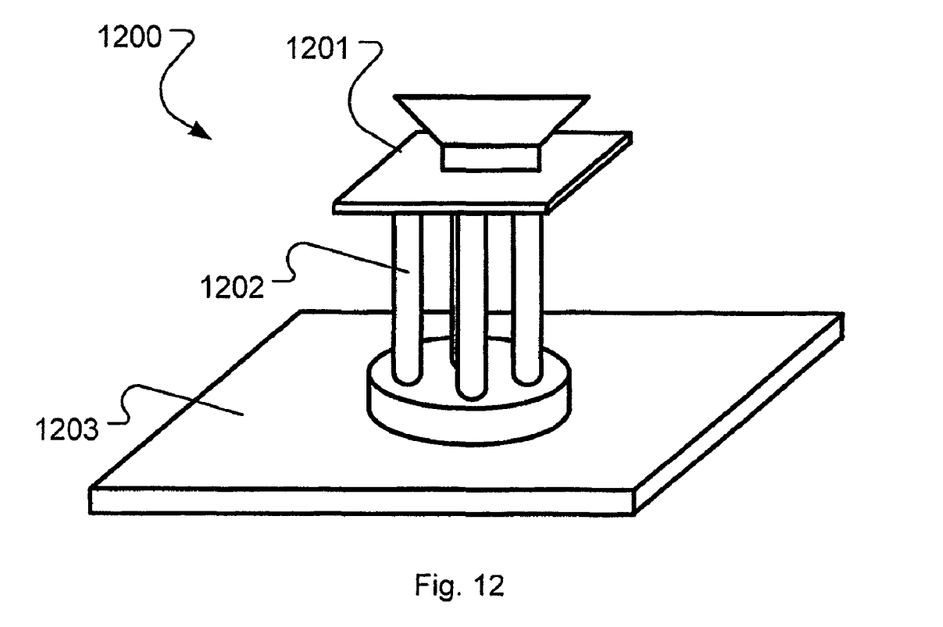
FIG. 12 shows a first and a second part connected together by an electroactive muscle, where the first part is the casing of a device and the second part is a speaker element.

FIG. 12 shows another schematic view of an electroactive muscle 1200 implemented in a device. In this example the electroactive muscle 1200, comprised of four electroactive actuators 1202, has been placed on a first part 1203 which in this case may be the casing of the device. The electroactive actuators 1202 have been connected to a second part 1201 which in this case may be or contain a speaker element producing sound to the surroundings of the device. A control unit (not shown in the figure) is connected to the electroactive muscle, capable of operating the electroactive muscle to move the first part in relation to the second part in all three dimensions (four dimensions counting x, y, z in space and time). In this way the speaker element may be moved, in relation to the user's ear(s), to allow for a better listening position for the user of the mobile communication device.

Figure 13:
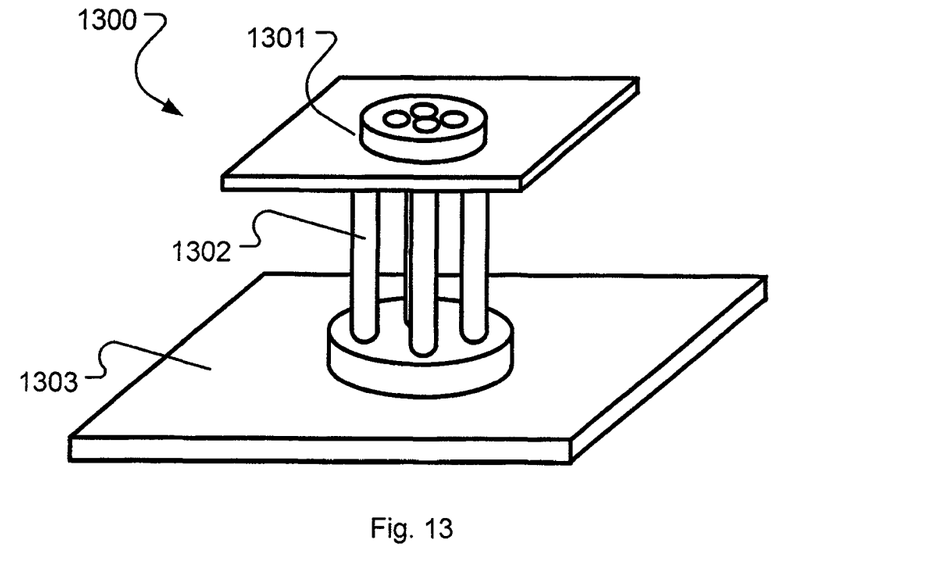
FIG. 13 shows a first and a second part connected together by an electroactive muscle, where the first part is the casing of a device and the second part is a microphone.

FIG. 13 shows another schematic view of an electroactive muscle 1300 implemented in a device. In this example the electroactive muscle 1300, comprised of four electroactive actuators 1302, has been placed on a first part 1303 which in this case may be the casing of the device. The electroactive actuators 1302 have been connected to a second part 1301 which in this case may be or contain a microphone for recording sound in the device's surroundings. A control unit (not shown in the figure) is connected to the electroactive muscle, capable of operating the electroactive muscle to move the first part in relation to the second part in all three dimensions (four dimensions counting x, y, z in space and time). In this way the microphone may be moved to allow for a better reception of the user's voice when speaking into the microphone, thus eliminating some of the interfering background noise.

Figure 14:
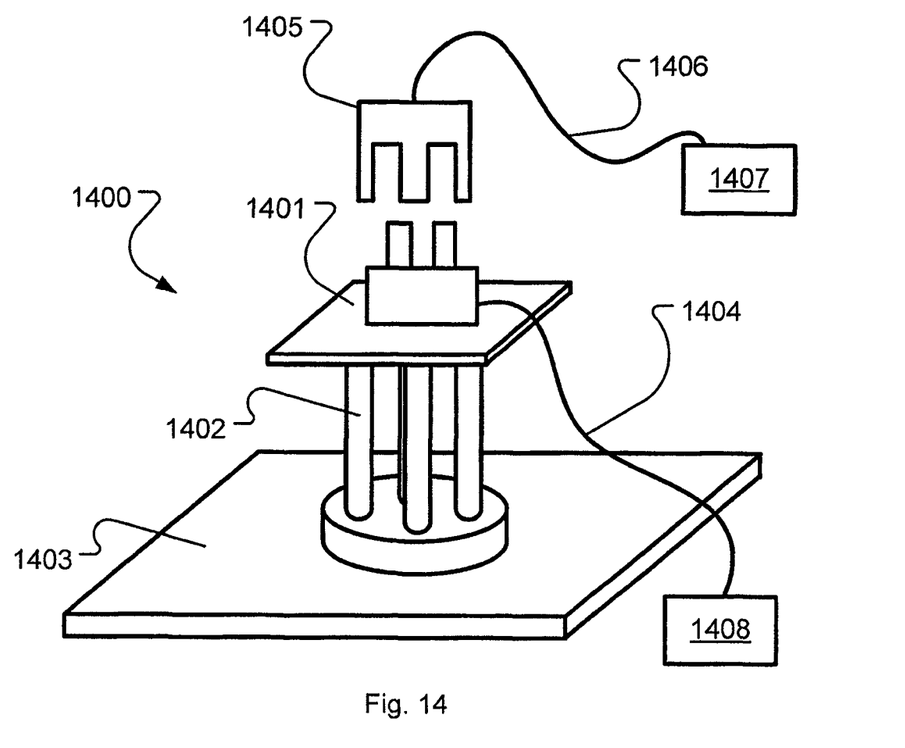
FIG. 14 shows a first and a second part connected together by an electroactive muscle, where the first part is the casing of a device and the second part is a contact.

FIG. 14 shows another schematic view of an electroactive muscle 1400 implemented in a device. In this example the electroactive muscle 1400, comprised of four electroactive actuators 1402, has been placed on a first part 1403 which in this case may be the casing of the device. The electroactive actuators 1402 have been connected to a second part 1401 which in this case may be or contain a contact, a connecting plug or a switch (all variations are from hereinafter referred to as a contact). A control unit (not shown in the figure) is connected to the electroactive muscle, capable of operating the electroactive muscle to move the first part in relation to the second part in all three dimensions (four dimensions counting x, y, z in space and time). In this way the contact 1401 may be moved in such way that the contact is inserted into a second contact 1405 (also known as a point, outlet, socket, etc. and hereinafter referred to as a second contact), shown as a male-female connection in FIG. 14, allowing for an electrical connection to be formed, so that an electrical signal may flow from one device 1408 to another device (or vise versa) 1407 through the wires 1404, 1406. In this way a steerable mechanical on-off switch may be produced. Also, the contacts 1401, 1405 may in one implementation be used as a mechanical locking device, securely locking two parts in a device together. For instance, if one part of the contact 105 is attached to the inside of a hatch of the device and the other contact 1401 is attached to an electroactive muscle 1400 attached to the casing of the device, the hatch could be electro-mechanically locked from within the device. The electroactive muscle 1400 with the contact may in another implementation be used to physically connect/disconnect electronic device to each other. For instance, if the mobile communication device contains several antenna implementations which shouldn't be used simultaneously, the electroactive muscle 1400 could physically connect to the antenna that should be used in a specific situation, and disconnect from any other unwanted antenna structure. Thus, allowing for a better electronic isolation between the antenna structures, resulting in better reception/transmission properties.

The electroactive muscles may also be made to cover the whole or part of the casing of the mobile communication device. When not operated the casing surface may look smooth and un-interesting, but when operated the electroactive muscles may form a three dimensional pattern on the surface of the mobile communication device by changing their shape. In this way the user or an application may shape the casing of the mobile communication device according to their own preference, creating and displaying three-dimensional patterns on the surface. In this way, an application may for instance print out received text messages or e-mails on the surface of the mobile communication device allowing the user to read the message without operating the device. This feature would be most welcomed by a visually impaired person who's not capable of operating the mobile communication device in the same manner as a person with 20/20-vision.

The terminology used herein is for the purpose of describing particular embodiments only and is not intended to be limiting of the invention. As used herein, the singular forms "a", "an" and "the" are intended to include the plural forms as well, unless the context clearly indicates otherwise. It will be further understood that the terms "comprises" "comprising," "includes" and/or "including" when used herein, specify the presence of stated features, integers, steps, operations, elements, and/or components, but do not preclude the presence or addition of one or more other features, integers, steps, operations, elements, components, and/or groups thereof.

Unless otherwise defined, all terms (including technical and scientific terms) used herein have the same meaning as commonly understood by one of ordinary skill in the art to which this invention belongs. It will be further understood that terms used herein should be interpreted as having a meaning that is consistent with their meaning in the context of this specification and the relevant art and will not be interpreted in an idealized or overly formal sense unless expressly so defined herein.

The foregoing has described the principles, preferred embodiments and modes of operation of the present invention. However, the invention should be regarded as illustrative rather than restrictive, and not as being limited to the particular embodiments discussed above. The different features of the various embodiments of the invention can be combined in other combinations than those explicitly described. It should therefore be appreciated that variations may be made in those embodiments by those skilled in the art without departing from the scope of the present invention as defined by the following claims.

The invention claimed is:

1. A portable communication device, comprising at least one electroactive muscle comprising:
   a first disc;
   a second disc;
   two or more electroactive polymer actuators connected to said first disc and said second disc;
   wherein said portable communication device further comprises a control unit, wherein said electroactive polymer actuators are adapted to move said first disc in relation to said second disc, and that said control unit is adapted to control said electroactive polymer actuators such that the electroactive muscle is capable of moving a structure connected to the electroactive muscle in three dimensions.

2. The portable communication device according to claim 1, wherein said control unit is adapted to control at least one of said electroactive polymer actuator in two dimensions.

3. The portable communication device according to claim 1, wherein said control unit is adapted to control at least one of said electroactive polymer actuator in at least three dimensions.

4. The portable communication device according to claim 1, wherein said control unit is adapted to control at least one of the electroactive polymer actuator by controlling the outer shape of said electroactive polymer actuator.

5. The portable communication device according to claim 1, wherein said control unit is adapted to control at least one of the electroactive polymer actuator by controlling the volume of said electroactive polymer actuator.

6. The portable communication device according to claim 1, wherein said electroactive polymer actuators are adapted to move said first and said second disc in a stepwise motion in relation to each other.

7. The portable communication device according to claim 1, wherein said electroactive polymer actuators are adapted to move said first and said second disc in a sliding motion in relation to each other.

8. The portable communication device according to claim 1, wherein at least one of said first disc and said second disc is comprised in an electronically maneuverable disc or a mechanically maneuverable disc or a combination thereof.

9. The portable communication device according to claim 1, wherein said first disc is comprised in the casing of said portable communication device, and said second disc is comprised in a hatch.

10. The portable communication device according to claim 1, wherein said first disc is comprised in the casing of said portable communication device, and said second disc is comprised in a display.

11. The portable communication device according to claim 1, wherein said first disc is comprised in the casing of said portable communication device, and said second disc is comprised in a button.

12. The portable communication device according to claim 1, wherein said first disc is comprised in the casing of said portable communication device, and said second disc is comprised in a pressure sensitive device.

13. The portable communication device according to claim 1, wherein said first disc is comprised in the casing of said portable communication device, and said second disc is comprised in a light sensitive device.

14. The portable communication device according to claim 1, wherein said first disc is comprised in the casing of said portable communication device, and said second disc is comprised in an antenna.

15. The portable communication device according to claim 1, wherein said first disc is comprised in the casing of said portable communication device, and said second disc is comprised in a speaker element.

16. The portable communication device according to claim 1, wherein said first disc is comprised in the casing of said portable communication device, and said second disc is comprised in a microphone.

17. The portable communication device according to claim 1, wherein said first disc is comprised in the casing of said portable communication device, and said second disc is comprised in a contact.

18. The portable communication device according to claim 1, wherein at least one of the discs is a stationary or movable part belonging to the structure.

19. A method for moving a first part in relation to a second part in a portable communication device, wherein said movement is performed by at least electroactive muscle comprising:
   a first disc;
   a second disc; and
   two or more electroactive polymer actuators connected to said first disc and said second disc;
   wherein the electroactive polymer actuators are controlled by a control unit, and wherein said electroactive polymer actuators are adapted to move said first disc in relation to said second disc, such that the electroactive muscle is capable of moving a structure connected to the electroactive muscle in all three dimensions.

20. The method according to claim 19, wherein the control unit controls at least one of the electroactive polymer actuator by applying a voltage to the electroactive polymer actuator.

21. The method according to claim 19, wherein the control unit controls the outer shape of at least one of said electroactive polymer actuator by altering an applied voltage to the electroactive polymer actuator.

22. The method according to claim 19, wherein the control unit controls the volume of at least one of said electroactive polymer actuator by altering an applied voltage to the electroactive polymer actuator.

23. The method according to claim 19, wherein at least one of the discs is a stationary or movable part belonging to the structure.

* * * * *